J. R. COKER.
SELECTIVE SIGNALING AND TRAIN STOP SYSTEM.
APPLICATION FILED NOV. 20, 1916.
1,336,889.
Patented Apr. 13, 1920.
8 SHEETS—SHEET 1.
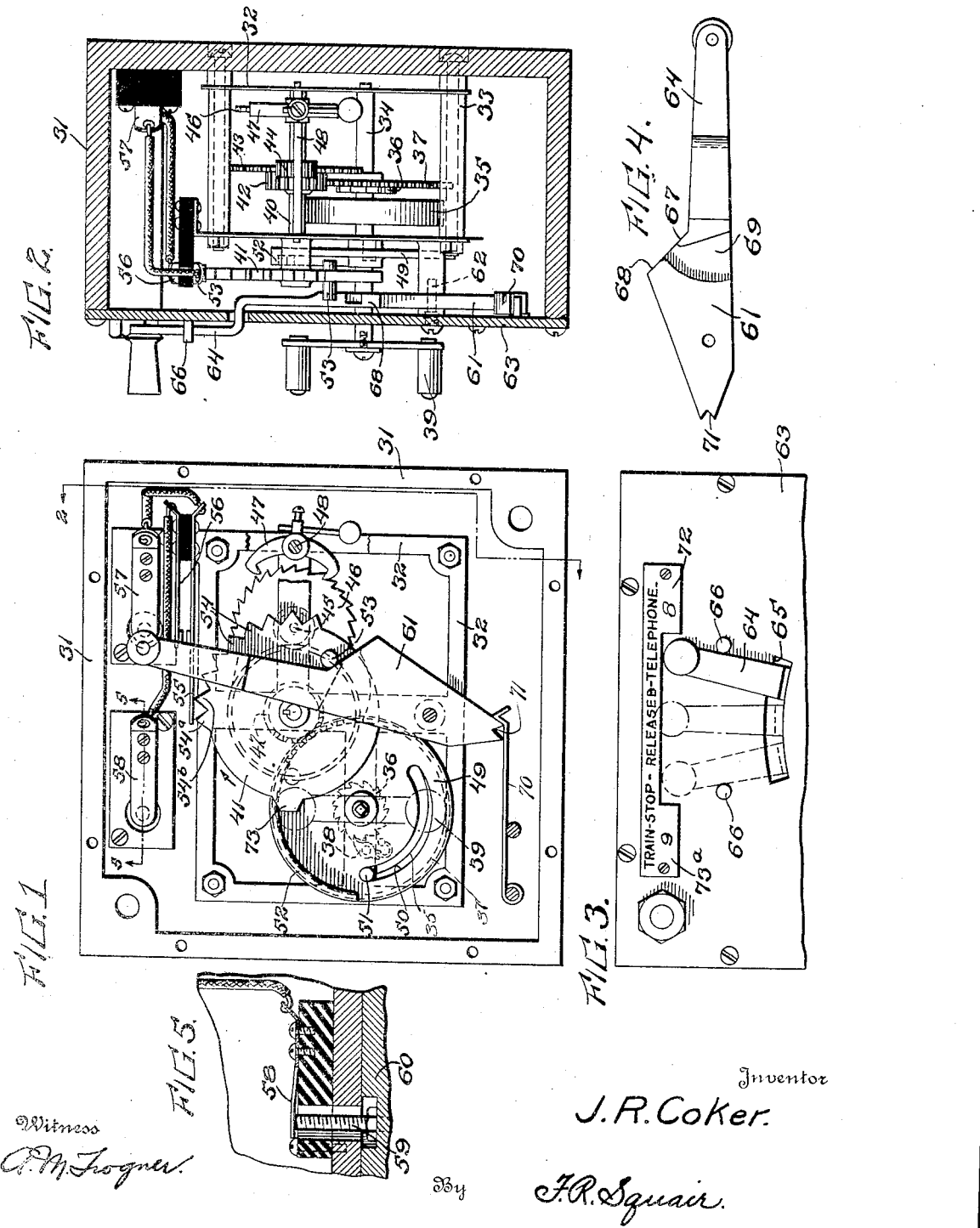
Inventor
J. R. Coker.
By F. R. Squair.
Attorney
Witness

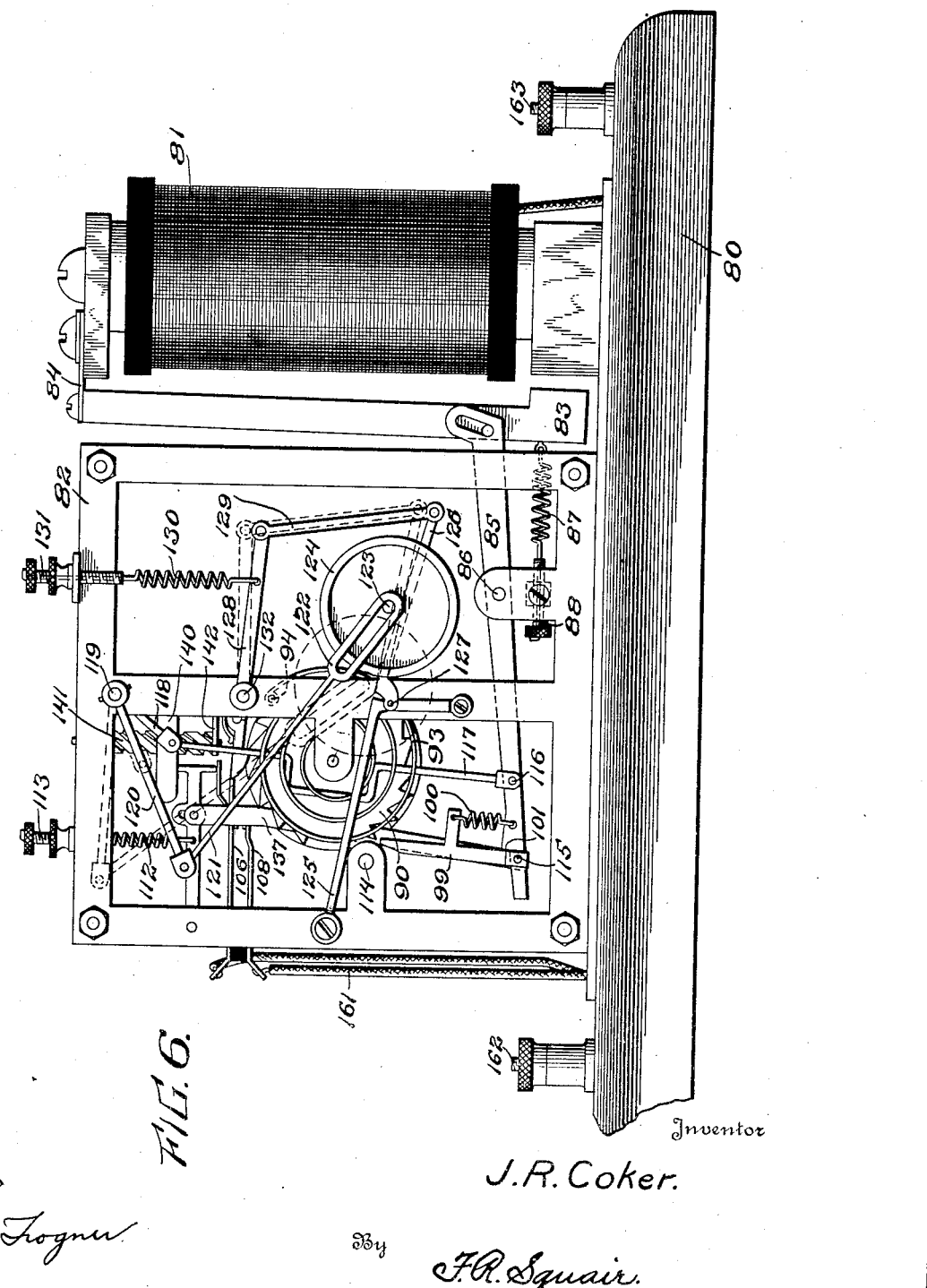

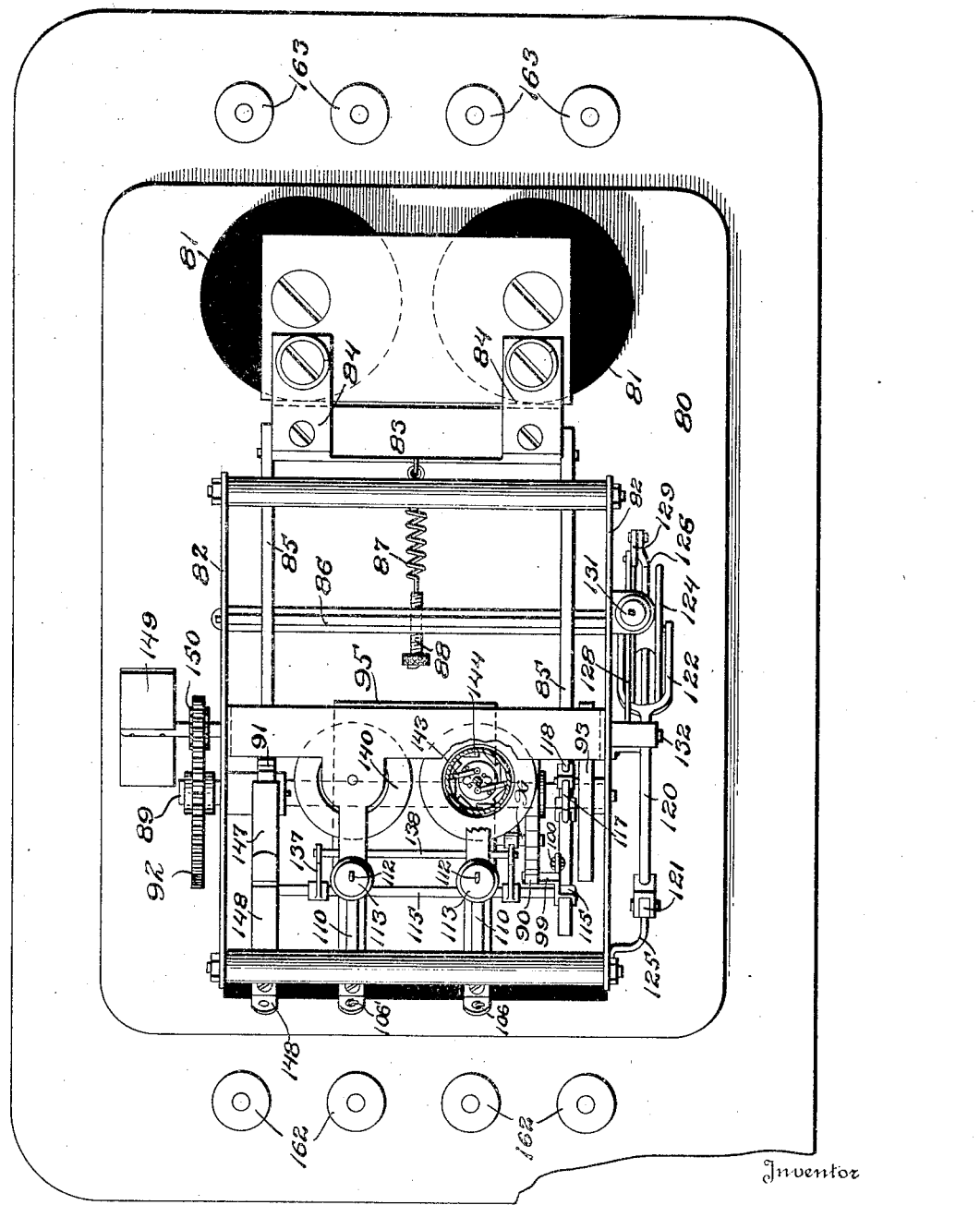

J. R. COKER.
SELECTIVE SIGNALING AND TRAIN STOP SYSTEM.
APPLICATION FILED NOV. 20, 1916.

1,336,889. Patented Apr. 13, 1920.
8 SHEETS—SHEET 4.

Inventor
J. R. Coker.

Witness
A. M. Fogner.

By
F. R. Squair
Attorney

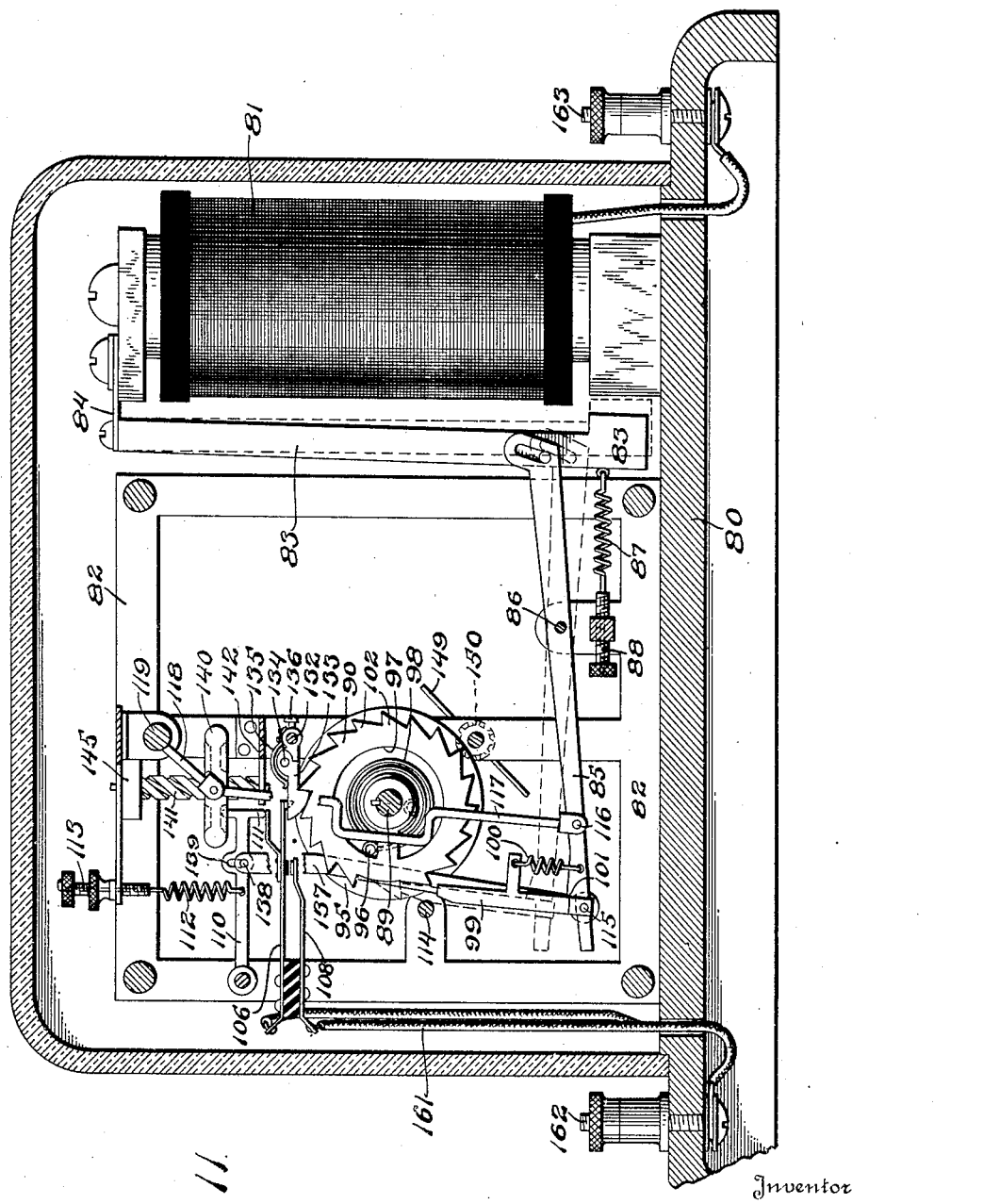

J. R. COKER.
SELECTIVE SIGNALING AND TRAIN STOP SYSTEM.
APPLICATION FILED NOV. 20, 1916.
1,336,889. Patented Apr. 13, 1920.
8 SHEETS—SHEET 6.
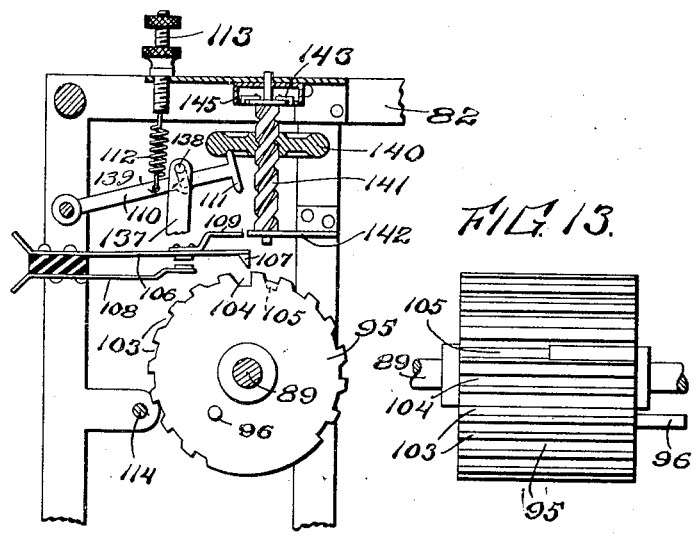
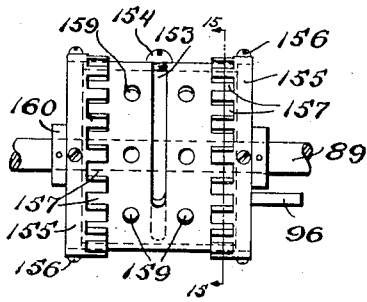
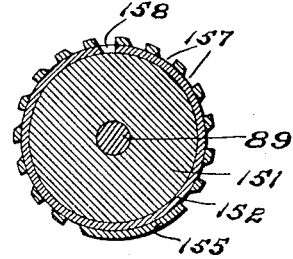
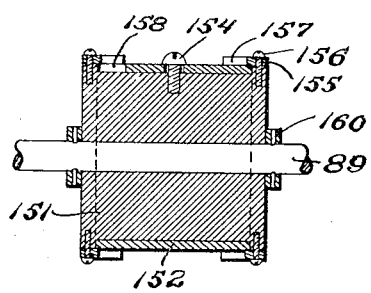

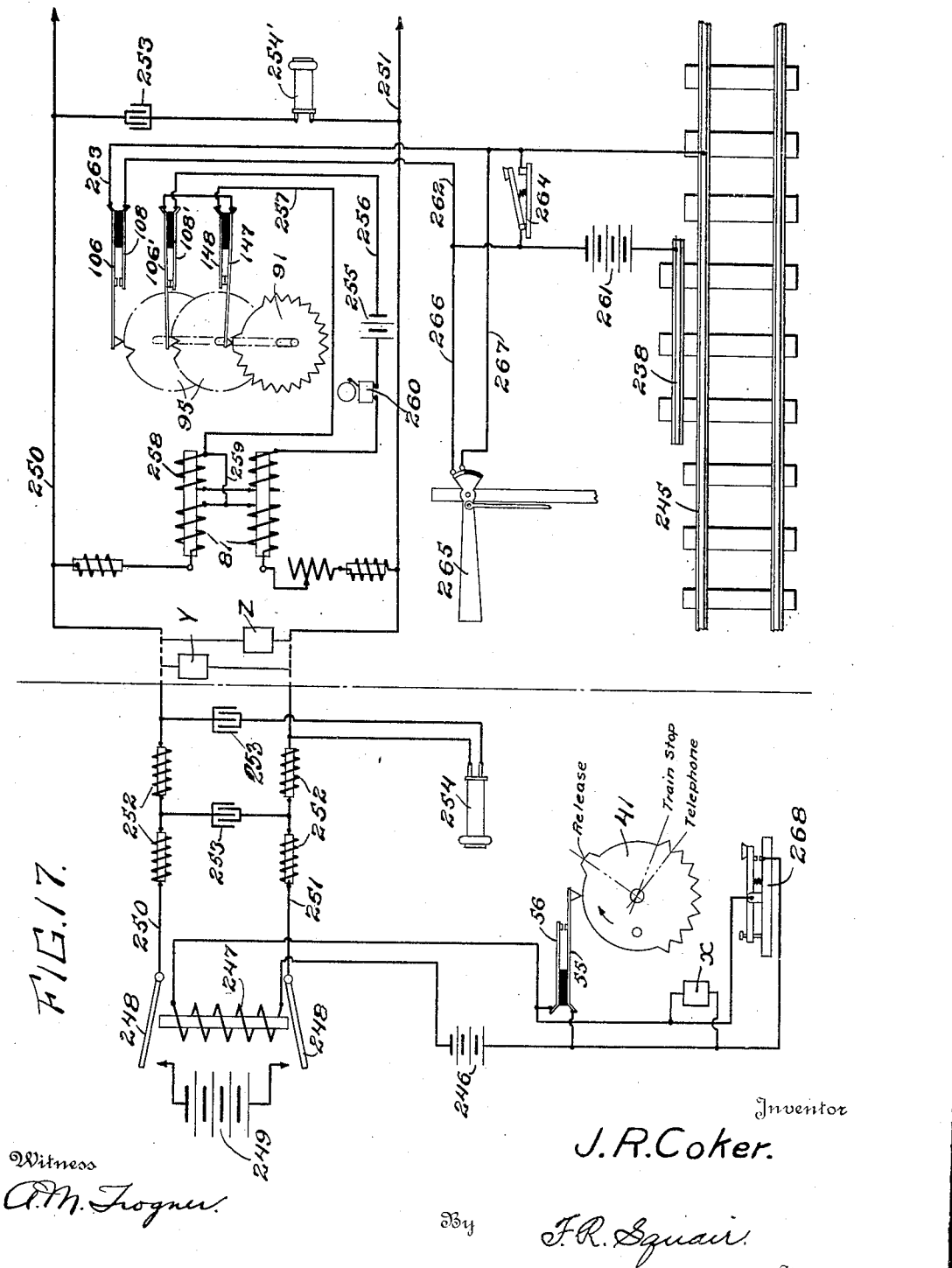

J. R. COKER.
SELECTIVE SIGNALING AND TRAIN STOP SYSTEM.
APPLICATION FILED NOV. 20, 1916.

1,336,889.

Patented Apr. 13, 1920.
8 SHEETS—SHEET 8.

Witness
P. M. Zogner

Inventor
J. R. Coker.

By F. R. Squair
Attorney

UNITED STATES PATENT OFFICE.

JAMES R. COKER, OF KNOXVILLE, TENNESSEE, ASSIGNOR TO S. I. COKER, OF KNOXVILLE, TENNESSEE.

SELECTIVE SIGNALING AND TRAIN-STOP SYSTEM.

1,336,889.  Specification of Letters Patent.  Patented Apr. 13, 1920.

Original application filed September 25, 1915, Serial No. 52,702. Divided and this application filed November 20, 1916. Serial No. 132,429.

*To all whom it may concern:*

Be it known that I, JAMES R. COKER, a citizen of the United States, residing at Knoxville, in the county of Knox and State of Tennessee, have invented certain new and useful Improvements in Selective Signaling and Train-Stop Systems, of which the following is a specification.

This invention relates to a selective system for stopping trains and to certain novel devices employed in connection therewith.

One of the principal features of this invention pertains to a novel selector mechanism which may be substituted for the selectors now in common use on railways without changing or increasing in number the line wires used in the ordinary signaling systems, and which functions either as a telephone signal alone or as a combined telephone signal and train-stop mechanism, depending upon the character of the current impulses impressed thereon.

Another feature of this invention is a new selective sending device or calling key to be used in connection with the above double acting selector.

This application is a division of application Serial No. 52,702, filed September 25, 1915.

In the operation of trains it not infrequently happens that the train despatcher becomes aware that a collision or other accident is impending with respect to one or more trains along the line of road under his supervision. In such a case it becomes highly desirable, and in fact essential, that the despatcher be able to stop one or more of these trains without the delay necessitated by having to get into communication with a local station agent or the engineer on the train, either one of whom may be incapacitated and unable to respond. The present system is designed to enable the chief despatcher to directly control and bring to a stop any train in his division as it passes certain predetermined points along the line of road.

The system of which the invention herein claimed forms a part comprises a plurality of way stations along a line of road connected by the ordinary line wires to a sending or despatcher's station, a selector at each of the way stations adapted when selectively operated to close a switch in one or more local circuits, and a train provided with an electrical and an air-brake equipment so constructed that when the train runs past a certain point in the vicinity of a way station whose selector has been operated the train circuit will close the local circuit and thereby cause the air-brake to operate independently of the engineer and bring the train to a stop by a full service application of the brakes. The train is also provided with means for automatically shutting off the motive power when it is desired to stop the train in this manner.

In this system in its preferred form my selector and sending device are designed to function ordinarily in the same way as the calling key and selector at present extensively used in telephone selective signaling systems, but they are also designed to enable the despatcher when the proper occasion arises to stop a train which is running near a certain station and at the same time to actuate the telephone signal at that station. In its preferred form this system also includes a local circuit which branches, the two branches leading to portions of the track somewhat widely separated with the station between them, so that where two trains are scheduled to pass through this station at about the same time on the same track as the result of a lap order, the train despatcher is enabled to stop both trains and thus prevent a collision.

In the accompanying drawings wherein a preferred embodiment of the invention is shown, Figure 1 is a front elevation of the calling or sending key, with cover removed and certain parts broken away;

Fig. 2 is a vertical section on the line 2—2 of Fig. 1;

Fig. 3 is a partial front elevation of the calling key with cover in place;

Fig. 4 is a detail of the indicating arm;

Fig. 5 is a horizontal section on the line 5—5 of Fig. 1, viewed from below;

Fig. 6 is a side elevation of the selector;

Fig. 7 is a top plan view of the selector;

Fig. 11 is a vertical longitudinal section on the line 11—11 of Fig. 8;

Fig. 12 is a partial vertical longitudinal section on the line 12—12 of Fig. 8, showing the contact wheel and its time element;

Fig. 13 shows the contact wheel in front elevation;

Fig. 14 shows a modified form of contact wheel;

Fig. 15 is a vertical section on the line 15—15 of Fig. 14;

Fig. 16 is an axial section of the modified contact wheel shown in Fig. 14;

Fig. 17 is a circuit diagram showing both the main and local circuits and the relative positions of the contact mechanisms in the calling key and selector when a telephone signal has been given;

Figure 8:
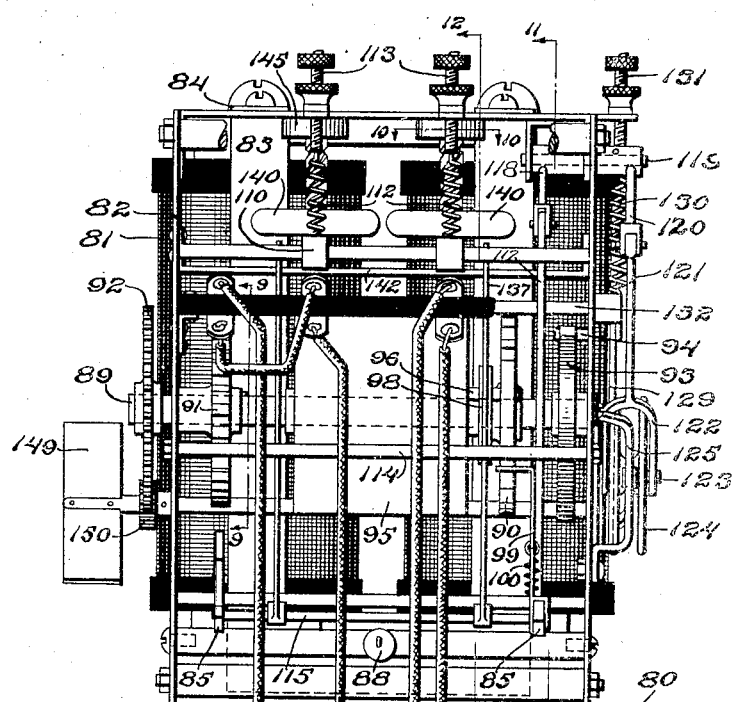
Fig. 8 is a front elevation of the selector with two of the frame members and the binding posts broken away and the contact wheel 95 shown without grooves.
Figure 9:
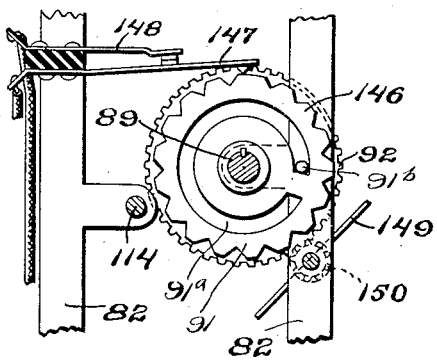
Fig. 9 is a vertical section on line 9—9 of Fig. 8, showing in detail the selective answer-back mechanism.
Figure 10:
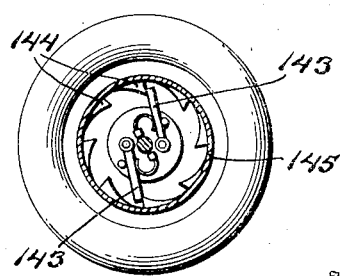
Fig. 10 is a horizontal section on line 10—10 of Fig. 8 showing in detail the pawl and ratchet arrangement on one of the upper time elements.

The sending device is shown in Figs. 1 to 5 and 18 to 21. The frame 31 supports an inner framework 32 on brackets 33. The inner framework 32 provides bearings for a shaft 34 on which is mounted a ratchet wheel 36. A spring 35 is fastened at one end to the shaft 34 and at the other end to the bracket 33. A pinion 37, loosely mounted on the shaft 34, carries a spring-pressed pawl 38 which engages with the ratchet 36. A handle 39 is fixed to one end of the shaft for winding up the spring.

A shaft 40 supported in the framework 32 has mounted thereon the contact wheel 41 and a pinion 42 which engages the pinion 37. A pinion 43 is also mounted on the shaft 40 and engages a pinion 44 mounted on a shaft 45 to which is fixed the escapement wheel 46; the escapement 47, oscillating from the shaft 48, engages the wheel 46.

On the shaft 34 is fastened the disk 49 which is provided with a slot 50 for a pin 51. A flange 52 extends part way around the periphery of the disk 49 and is so placed as to stop the stud 53 when the disk is turned to a certain position. The position of the stud 53 when so stopped is shown in dotted lines in Fig. 1.

The contact wheel 41 has teeth 54 which serve to actuate the contact arm 55 and make contact with the arm 56. The contact arms 55 and 56 are connected by wires to the terminals 57 and 58 respectively. These terminals are preferably spring leaves as shown in Fig. 5, adapted to press against the terminals 59 when the sending device is fastened in position on the ordinary cabinet or wall panel shown in part at 60.

An indicating arm 61 is pivoted on a pin 62 which projects through, and is fastened to, the cover 63. One end of the indicating arm is bent as at 64 so as to project through the slot 65 in the cover plate. Studs 66 on the cover plate are adapted to limit the travel of the indicating arm 61. A shoulder 67 on one side of the indicating arm is so positioned as to stop the stud 53 when the arm is in one position and another shoulder 68 is positioned to stop the stud in another position of the indicating arm. A groove 69 is cut out of the rear side of the indicating arm and is so shaped as to allow the stud 53 to pass under the arm when the latter is in the vertical or neutral position. A spring 70 engages the indicating arm at 71 and holds it in either one of three positions.

On the cover plate there are engraved or stamped the numerals corresponding to the particular local station which the sending device operates. The numeral "8" at 72 in Fig. 3 represents the number of impulses to actuate the telephone signal and the numeral "9" at 73ª represents the number of impulses to actuate both the telephone signal and the train stop mechanism.

A modification of the calling key is shown in Figs. 18 to 21. This differs from the key just described in having the spring 35 of large capacity so that one winding of the spring will serve for a large number of operations of the calling key. It also differs in having the indicating arm 61 formed with a projection 74 which has a shoulder 75 adapted to stop the stud 53 in the same position as by the flange 52 shown in Fig. 1.

There should ordinarily be a large number of sending devices such as the one described at the sending station, the number corresponding to the number of way-stations which have selectors. In Fig. 17 a second sending device is shown diagrammatically at X, this sending device being the same as the one above described except that it is designed to send a different number of impulses over the line.

The selector is shown in Figs. 6 to 16 inclusive. On the base 80 are mounted the electro-magnets 81 and the framework 82. An armature 83 is fastened by spring 84 to one end of the magnet and serves to oscillate the lever 85 about the fulcrum 86. The armature 83 is held away from the magnet by the spring 87, adjustable at 88.

The framework 82 supports a shaft 89 on which are keyed the step-by-step ratchet wheel 90, the answer-back wheel 91, and the pinion 92. A coiled spring 93 is fastened at one end to the shaft 89 and at the other to a pin 94. A contact wheel 95, loosely mounted on the shaft 89, carries a projecting arm or stud 96, which runs in a slot 97 in the ratchet wheel 90. This stud 96 is fastened by a coiled spring 98 to the shaft 89 and is normally pressed in a counter-clockwise direction with respect to said shaft, as shown in Fig. 11.

The ratchet wheel is actuated by the pawl 99, engaging one of the teeth 102: the pawl 99 is pivoted to the shaft 115 and held against the shoulder 101 on one of the levers 85 by the spring 100. The overthrow of the ratchet wheel is prevented by the rod 114 against which the pawl presses at the proper limit of its motion. The contact wheel 95 is provided with shallow grooves or depressions 103 equally spaced about the greater portion of its periphery, as shown in Figs. 12 and 13. One of these grooves 104, deeper than the others, extends from one side to the other of the contact wheel; another groove 105 is deeper than the others at one side of the wheel. The contact arm 106 fastened at one end to the framework carries at the other end a detent 107, which is adapted to be pressed from above into one of the grooves, and when sufficiently depressed, 106 makes contact with the corresponding arm 108. When not pressed from above, the arm 106 normally holds the detent 107 away from the contact wheel. Contact arms 106' and 108' (see Fig. 17) are actuated in the same way as contact arms 106 and 108 to allow current to pass through the alarm circuit. The arms 110, pivoted to the framework, are T-shaped at one end as at 111. One of the ends 111 is adapted to press down on the extension 109 and to be pressed upward against one of the gravity disks 140. The other end 111 is adapted to press down on an extension similar to 109 carried on spring 106' and to be pressed upward against the other disk 140. The arms 110 are normally suspended by the spring 112, which may be adjusted at 113. A link 117, pivoted at its lower end at 116 to one of the levers 85 and at its upper end to the crank 118, serves to oscillate the shaft 119. An arm 120 is rigidly fixed to the shaft 119 and is joined at its free end to the arm 121, having a slot 122 in which the axle 123 of a gravity wheel 124 is free to move. A run way 125 for the gravity wheel 124 is fastened to the framework and has pivoted thereon at 127 an oscillating run way 126. An arm 128, keyed to the shaft 132, is connected by the link 129 to the run way 126. A jointed pawl 133 adapted to successively engage the teeth 102 of the ratchet wheel is fastened by a set screw 136 to the shaft 132; the end of the pawl 133 is connected by a jack knife joint at 134 to the part which is fastened to the shaft 132 and is pressed by the spring 135.

From these connections it will be seen that when the gravity wheel is at the lower end of the run way 126, the pawl will be moved out of engagement with the ratchet wheel 90, but when the gravity wheel is pulled up the run way by the motion of the rod 121, the spring 130 will raise the arm 128 and cause the pawl to engage the teeth of the ratchet wheel.

On the shaft 115, which passes through the levers 85, are pivoted the links 137 which are connected at their upper ends to the arms 110 by a rod 138 which has a limited movement in the slots 139. Gravity disks 140 have teeth which engage the threads of screws 141. The screws 141 are loosely mounted at their upper ends in the framework and at their lower ends in the extension 142, and the threads thereof have a steep pitch so that a vertical movement of the disks 140 will readily cause a rotation of the screws 141. Each screw 141 carries at its upper end two spring-pressed pawls 143, which allow it to rotate in one direction only by engaging the teeth 144 of an interior ratchet wheel 145. A vertical movement of the arms 110 will raise the gravity disks 140 by a movement which is unimpeded by the screws 141 in view of the fact that the latter are free to turn; the disks 140 are for the most part held against any rotary movement by the friction on the ends 111 of the arms 110, but when the arms 110 are lowered in order for the disks 140 to come downward, they must revolve about the screws 141 since the latter are prevented from turning by the pawls and ratchets. These time elements are preferably adjusted so as to have the same period which is a somewhat shorter period than the gravity wheel 124, the period of the wheel being the time it takes to travel from its uppermost position to the place on the runway 126 at which it depresses the latter.

The means for giving a selective answer-back signal is comprised in a contact wheel 91 having teeth 146 which cause the contact arm 147 to make a contact with the arm 148 when this wheel is rotated in either direction. The answer back wheel 91 is provided with a slot 91ª which engages a stationary pin 91ᵇ, the extent of the rotation of the wheel 91 and the shaft 89 to which it is keyed being thereby limited by the stationary pin. A retarding device is shown at 149 in the form of a rotating paddle which is caused to rotate by the pinion 92 in mesh with the pinion 150, which latter is rigidly attached to the paddle; the wheel 92 moves in unison with the ratchet wheel 90 and the contact wheel 91.

The contact wheel 95 may be constructed in various ways without departing from my invention. One such embodiment is shown in Figs. 14, 15 and 16. In this construction, the grooves of additional depth, corresponding to grooves 104 and 105, can be moved with respect to pin 96, so that the same contact wheel may be used for any station upon suitable adjustment. In this modification a core 151 has mounted thereon a cylindrical shell 152 provided with a slot 153 allowing circumferential movement of the shell with respect to the screw 154. At each end of the core are annular members 155 having on their inner sides teeth which extend over the shell 152 and provide shallow depressions 157, one of which coincides with the aperture 158 in the shell. The shell is also provided with holes 159 which permit of the insertion of a rod or pin for adjusting the position of the shell 152. The annular members 155 are held in place by screws 156 which extend into the core; the core itself being held in place on the shaft 89 by collars 160 at each end of the core.

Contact arm 108 is connected by wire 161 to a terminal 162, and one end of coil 81 leads to another terminal 163.

My invention is not limited to the selector above described, but in its broader aspect includes in combination any type of selector which functions in a plurality of ways depending upon the kind of impulses which are used to operate it.

A second selector, similar to the one above described, is shown diagrammatically at Y. Telephone connections are shown diagrammatically at Z, corresponding to condenser 253 and telephone receiver 254, this connection being at the same way-station as the selector Y.

The various circuits employed, shown diagrammatically in Fig. 17, comprise a local circuit at the despatcher's office having a battery 246 which supplies current for the sending device represented by the contact wheel 41. The closing of this circuit, which includes an electro-magnet 247, when the calling key is operated actuates the contacts 248 and closes the main line circuit having a source of current 249. The line wires 250, 251 have the usual choke coils 252 and condensers 253. Telephone receivers 254—254' bridge the line at the despatcher's station and at the several local stations. The electro-magnets 81 bridge the line at each local station. The local signal circuit is shown with a battery 255 which leads through the wire 256 to the contact arm 108' and thence to 106', which is actuated when the contact wheel is in the proper position, then to the contact arm 147 of the answer-back mechanism to the arm 148 through the wire 257 to the coil 258 on the electro-magnet 81, and from there through the signal 260 to the battery. The coil 258 is connected at 259 to the main line coil in order to avoid a static difference in potential in the two coils.

The train stop circuit has a battery or other source of current 261 which leads through the connection 262 through contact arms 108 and 106 through wire 263 to the rail 245, and then through the train circuit to the ramp rail 238 back to the battery. An emergency switch 264 is placed across the line so that the train stop mechanism may be actuated if necessary from the local station independently of the selector. The diagram also shows a semaphore 265 adapted to close the circuit when in its danger position through wires 266 and 267 in bridge of said circuit. An emergency key 268 bridges the line at the sending station so that by a single depression of this key any selector contact wheel which is in an advanced position will be returned to its initial position.

The operation of the system will now be described. When the sending device at the despatcher's station is not operating, the indicating arm 61 thereof is in the neutral vertical position and the flange 52 is in contact with the pin 53 on the contact wheel. In the modified form of sending device the pin 53 will be held by the shoulder of the arm 74. When the despatcher desires to call a particular station in order merely to communicate therewith, he moves the indicating arm to the right as shown in Fig. 3 to the telephone position; the handle 39 is then turned to the limit of its motion and released; in so doing the handle moving flange 52 winds the spring 35 and releases the stud 53. When the handle 39 is released the spring will cause the contact wheel to rotate and the teeth thereof will actuate the contact arm 55 a number of times corresponding to the number of teeth on the wheel. When the indicating arm has been placed in the telephone position, the shoulder 67 will stop the stud 53, and consequently the contact wheel, at such a point that the detent of the contact arm 55 will be between the ultimate and penultimate teeth 54ᵃ and 54ᵇ. The actuation of the contact arm 55 will result in setting up of a series of current impulses over the line wires which will rapidly energize the electro-magnet 81 and cause the ratchet wheel 90 and the contact wheel 95 of the selector mechanism to be progressed to a predetermined position. When the signal has been answered by the local station agent, the indicating arm is moved back to its neutral position. This movement brings the slot 69 in line with the stud 53 and allows the latter to pass under the indicating arm to its starting position where it is held by the flange 52. While the contact wheel passes from its end position to its starting position, both the tooth 54ª and the tooth 73, which is somewhat extended, will cause the arm 55 to make a contact. The two contacts thus made will have a pause of considerable length between them so that the selector will be actuated to release its contact wheel without the ratchet wheel being stepped up, as will be more fully described hereinafter. The contact wheel of the calling key is given a slow uniform motion by means of the usual escapement mechanism.

When the despatcher desires to set the train stop circuit as well as to get in telephonic communication with the local station agent, he moves the indicating arm to the left or train stop position. When the spring is wound and the contact wheel rotated, it will be stopped in this case by the shoulder 68 which is in such a position as to allow all of the teeth to pass under and actuate the contact arm 55. The number of impulses sent to the selector in this case is, therefore, one more than is sent when the indicating arm is in the telephone position, and the contact wheel is progressed one position further than when the telephone signal alone is given. When the indicating arm is moved back to its released position, the contact wheel is allowed to travel back to its starting position as above described, sending a single releasing impulse over the wires to the selectors.

Figure 18:
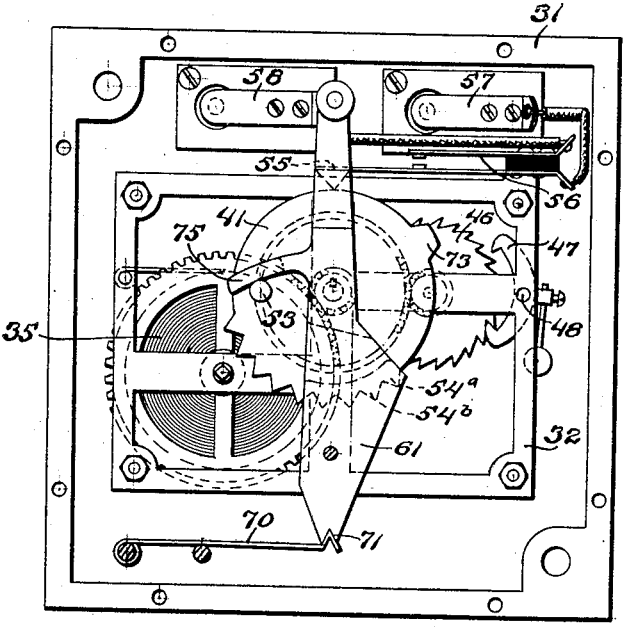
Fig. 18 is a front elevation of a modified form of calling or sending key with cover removed.
Figure 21:
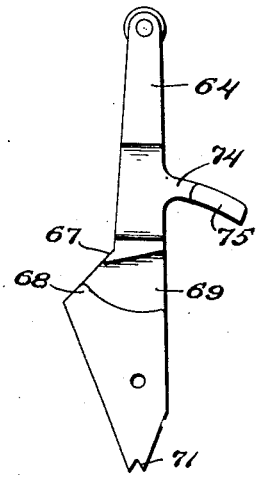
Fig. 21 is a rear elevation of the modified form of indicating arm.
Figure 19:
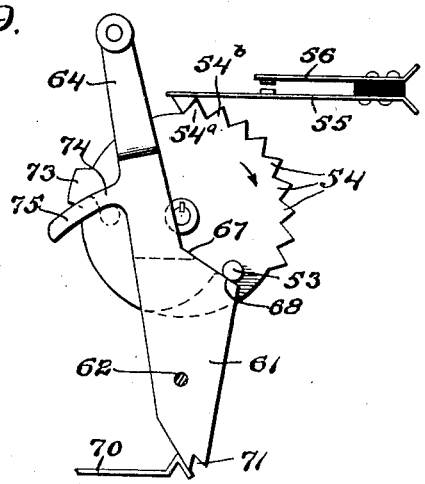
Fig. 19 is a front elevation of the indicating arm and contact wheel after the calling key has been operated.
Figure 20:
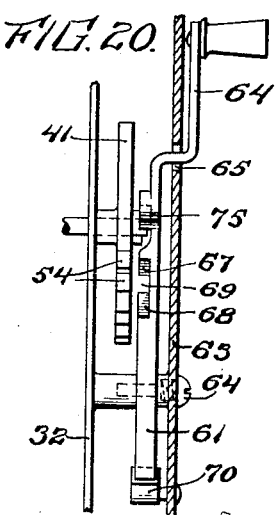
Fig. 20 is a side elevation of part of the modified calling key showing the indicating arm in neutral position and the cover in place.

When the modification shown in Fig. 18 is used, one winding of the spring 35 will be sufficient to operate the calling key a large number of times. In this case when the local station is to be called it is only necessary to move the indicating arm to the telephone or train stop position.

When the electro-magnet of the selector is energized it attracts the armature 83 and moves the levers 85 about their fulcrum, causing the arm 99 to turn step-by-step the contact wheel 90 to a position determined by the number of energizations, quickly succeeding each other, of the electro-magnet. The ratchet wheel engaging the pin 96, which projects from the contact wheel 95, causes the contact wheel to move in unison with it. The movement of the levers 85 at the same time through the arms 117, 118, 120 and 121 causes the gravity wheel 124 to be pulled up its run way onto that part of the run way indicated at 125 and allows the pawl 133 to hold the ratchet wheel at each advanced position thereof. The movement of the levers 85 also serves to raise the time elements 140 through the motion of the members 137, which raise the arms 110. The several energizations of the magnet succeed each other so quickly that the time elements 124 and 140 do not have time to come to their resting position; the spring contact arms 106 and 106' are consequently permitted to hold the detents out of the depressions or grooves in the contact wheel and thus avoid interfering with the movement of said wheel while the latter is being moved around to its predetermined position. As soon as a pause occurs, the time element 124 starts to move down on the run way 126. When it has moved a certain distance, the run way 126 turns on its pivot 127 and raises the pawl 133 out of engagement with the ratchet wheel 90, permitting the spring 93 to return the ratchet wheel to its starting position. Before the gravity wheel 124 has effected this release of the ratchet wheel, however, the time elements 140 have moved down and one of them has pressed the detent 107 on the contact arm 106 into one of the grooves on the contact wheel. When the ratchet wheel is turned back into its starting position, the contact wheel is held in its advanced position; this motion of the ratchet wheel with respect to the contact wheel serves to place the spring 98, which connects the two wheels, under an increased tension. All the selectors along the line will be moved up to the same extent but only one selector will have a deep groove 104 or 105 under the detent in any given advanced position. In that selector which is to be operated, therefore, the contact arm 106 will be pressed down to such an extent that it will make a contact with its corresponding arm 108, whereas in those selectors which are not to be operated, the shallow grooves in the contact wheel will allow the detent to be moved down only a small distance sufficient to hold the contact wheel in its advanced position but insufficient to allow the contact arm 106 to make a contact with the arm 108. When the contact has been made in the particular selector, it is maintained until a positive release impulse has been sent through the line wires. To release the contact wheel, a single positive impulse, initiated at the despatcher's station, either by putting the indicating arm in released position or by actuating the emergency switch, is sent over the wires and the resulting energization of the electro-magnets effects the raising of the time elements 140 and allows the contact arm 106 to raise itself out of the groove 105 and permits the spring 98, pressing on the pin 96, to return the contact wheel to its starting position. In the train-stop position, the contact arms 106 and 106' will both be fully depressed, their detents entering the long groove 104. Both arms will in that case be simultaneously released by a single impulse on the line.

This single energization momentarily moves the ratchet wheel one step forward so that the contact wheel when it returns as far as the pin 96 will allow, will be advanced one step; in order to prevent the contact wheel being held in this position by the detents on the contact arms, that portion of the cylindrical surface of the contact wheel corresponding to the first step forward is made without a groove. After this single actuation of the several parts and after the pawl 133 has been raised to allow the ratchet wheel to return from its first position to its starting position, the contact wheel will consequently move back with it. It will, therefore, be apparent that a single impulse sent over the line wires will in all cases serve only to release any selector that has been stepped up without otherwise affecting the various selectors.

The contact wheel is provided with a deep groove which extends clear across the periphery and with a second deep groove which extends only part way across the periphery and adjacent to the first groove, so that in one position of the contact wheel both contact arms 106 and 106' will be pressed down sufficiently to make contacts, this being the train stop position, whereas in the other advanced position only the contact arm 106' can be sufficiently depressed to make a contact with its corresponding arm 108'.

The local signal circuit passes through contact arms 147 and 148 as well as through arms 106' and 108'. As soon as the circuit is closed by the contact arm 106' being sufficiently depressed, the current rings the bell 260 which, by making and breaking the circuit, induces a return current in the electro-magnet 81 and the line wires. When the ratchet wheel 90 returns, the answer-back contact 91 which moves in unison with the wheel 90, slowly makes and breaks the local signal circuit, thereby effecting a series of audible signals in the line wires and a pause between each one sufficient to enable the despatcher to determine whether or not the number of separate audible signals corresponds to the station being called. It will be seen that the answer-back mechanism has no effect on the local signal circuit until after contact arm 106' has been pressed down into one of the deep grooves so as to make a contact.

I claim:

1. In a selector for an electrical selective system, the combination with a step-by-step progressing element, electromagnets for advancing said element to a predetermined position, means for closing a circuit when said element has reached said position, and a spring arranged to be placed under tension by the advance of said element, of an answer-back mechanism operating automatically by means including said spring for initiating a series of impulses peculiar to the said selector after said circuit has been closed, substantially as described.

2. In an electrical selective system comprising a sending station telephonically connected by line wires to a plurality of local stations, an electromagnet bridging said line wires at each of said local stations, a step-by-step element advanceable by the repeated energizations of said electromagnet to a predetermined position for closing a local signal circuit which is in inductive relation with said electromagnet, and means operating automatically for initiating a series of impulses in said local circuit after the latter has been closed which induces a series of audible impulses in the line wires peculiar to said local circuit, substantially as described.

3. A selector for an electrical selective system comprising a ratchet wheel, an electromagnet for advancing said wheel to a predetermined position, a cylinder co-axially mounted with respect to said wheel, a rigid connection between said wheel and said cylinder, preventing backward motion of the latter with respect to said wheel for advancing said cylinder in unison with said wheel, a spring connection between said wheel and said cylinder permitting backward movement under tension of the wheel with respect to said cylinder, a series of depressions around the surface of said cylinder, a contact arm adapted to engage one of said depressions, a spring, stronger than the first mentioned spring, tending to return the ratchet wheel from its advanced, to its starting position, a pawl for holding said wheel in its advanced position, a time element actuated by said electromagnet and in its resting state adapted to disengage said pawl from said wheel, and another time element actuated by said electromagnet for forcing the contact arm into a predetermined depression in the cylinder when said time element moves into its resting position and thereby effecting a contact in a local circuit, substantially as described.

4. In a selector for a selective-signaling and train-stop system, a cylindrical circuit closing element having a series of depressions circumferentially disposed thereon, an electromagnet, a ratchet wheel operated by said electromagnet for advancing said element to a predetermined position, a time-element, means actuated by said time-element and engaging one of said depressions for holding the circuit closing element in an advanced position, means for effecting the return of the ratchet wheel to its starting position while the circuit closing element remains in its advanced position, and means actuated by a single energization of the electromagnet for returning said circuit closing element to its normal starting position, substantially as described.

5. In an electrical selective system comprising a sending station connected by line wires to a plurality of local stations, an electromagnet bridging said line wires at each of said local stations, a step-by-step element advanceable by the repeated energizations of said electromagnet to a predetermined position for closing a local signal circuit which is in inductive relation with said electromagnet and for placing at the same time another local circuit in operative condition, and means for initiating a series of impulses in said local signal circuit after the latter has been closed which induces a series of audible impulses in the line wires peculiar to said local circuit, substantially as described.

6. In a selector for a selective-signaling and train-stop system, an element for closing a local circuit and an answer-back wheel, an electromagnet, a ratchet wheel operated by said electromagnet for advancing said element and answer-back wheel to a predetermined position, a time element, means actuated by said time element for engaging and holding the circuit closing element in an advanced position, means for effecting the return of the ratchet wheel and the answer-back wheel to their starting positions, and means actuated by the answer-back wheel on its return movement for initiating a series of impulses in the local circuit which induces a series of audible impulses in the line wires peculiar to said local circuit, substantially as described.

7. In a selector for a selective-signaling and train-stop system, an element for closing a local circuit and an answer-back wheel, an electromagnet, a ratchet wheel operated by said electromagnet for advancing said element and answer-back wheel to a predetermined position, a time element, means actuated by said time element for engaging and holding the circuit closing element in an advanced position, means for effecting the return of the ratchet wheel and the answer-back wheel to their starting positions, means actuated by the answer-back wheel on its return movement for initiating a series of impulses in the local circuit which induces a series of audible impulses in the line wires peculiar to said local circuit, and means actuated by a single energization of the electromagnet for returning said circuit closing element to its normal starting position, substantially as described.

In testimony whereof I affix my signature.

JAMES R. COKER.